(12) United States Patent
Gauvreau et al.

(10) Patent No.: US 8,953,548 B2
(45) Date of Patent: *Feb. 10, 2015

(54) METHOD AND APPARATUS FOR MONITORING AND PROCESSING COMPONENT CARRIERS

(71) Applicant: Interdigital Patent Holdings, Inc., Wilmington (DE)

(72) Inventors: Jean-Louis Gauvreau, La Prairie (CA); Paul Marinier, Brossard (CA); Guodong Zhang, Syosset, NY (US); Ulises Olvera-Hernandez, Kirkland (CA)

(73) Assignee: Interdigital Patent Holdings, Inc., Wilmington, DE (US)

( * ) Notice: Subject to any disclaimer, the term of this patent is extended or adjusted under 35 U.S.C. 154(b) by 26 days.

This patent is subject to a terminal disclaimer.

(21) Appl. No.: 13/940,879

(22) Filed: Jul. 12, 2013

(65) Prior Publication Data

US 2014/0016506 A1    Jan. 16, 2014

Related U.S. Application Data

(63) Continuation of application No. 12/578,673, filed on Oct. 14, 2009, now Pat. No. 8,514,793.

(60) Provisional application No. 61/110,209, filed on Oct. 31, 2008.

(51) Int. Cl.
*H04W 4/00* (2009.01)
*H04J 1/00* (2006.01)
(Continued)

(52) U.S. Cl.
CPC ............ *H04W 24/02* (2013.01); *H04W 72/048* (2013.01); *H04L 5/0096* (2013.01); *Y02B 60/50* (2013.01)

USPC .......... 370/329; 370/343; 370/437; 370/468; 455/450; 455/452.1; 455/464

(58) Field of Classification Search
USPC ......... 370/252, 329, 330, 343, 344, 433, 437, 370/443, 468, 480, 482; 455/450, 452.1, 455/464, 509
See application file for complete search history.

(56) References Cited

U.S. PATENT DOCUMENTS

| 6,961,570 B2 | 11/2005 | Kuo et al. |
| 8,184,599 B2 | 5/2012 | Gholmieh et al. |

(Continued)

FOREIGN PATENT DOCUMENTS

| CN | 1943259 A | 4/2007 |
| CN | 101273568 A | 9/2008 |

(Continued)

OTHER PUBLICATIONS

Ericsson, "Framework for DC-HSDPA operation", R1-081884, 3GPP TSG RAN WG1 Meeting #53, Kansas City, MO, USA, May 5-9, 2008, 3 pages.

(Continued)

*Primary Examiner* — Awet Haile
(74) *Attorney, Agent, or Firm* — Condo Roccia Koptiw LLP

(57) ABSTRACT

A method and apparatus are described which perform bandwidth aggregation by simultaneously monitoring and processing a number of simultaneous, non-contiguous or contiguous component carriers in the downlink. A wireless transmit/receive unit (WTRU) can be configured by an evolved Node-B (eNodeB) to support additional component carriers. A pre-configured additional component carrier may be used. Various methods for activating and deactivating the additional component carrier are also described.

20 Claims, 2 Drawing Sheets

(51) Int. Cl.
*H04W 24/02* (2009.01)
*H04W 72/04* (2009.01)
*H04J 3/22* (2006.01)
*H04W 72/00* (2009.01)
*H04L 5/00* (2006.01)

(56) References Cited

U.S. PATENT DOCUMENTS

| | | | |
|---|---|---|---|
| 8,711,785 | B2 | 4/2014 | Gholmieh et al. |
| 2008/0212524 | A1 | 9/2008 | Niwano |
| 2009/0046631 | A1* | 2/2009 | Meylan et al. ............... 370/328 |
| 2009/0149162 | A1* | 6/2009 | Tenny ........................ 455/414.1 |
| 2009/0170426 | A1* | 7/2009 | Jung et al. ........................ 455/7 |
| 2009/0238098 | A1 | 9/2009 | Cai et al. |
| 2009/0268831 | A1 | 10/2009 | Onggosanusi et al. |
| 2009/0316659 | A1 | 12/2009 | Lindoff et al. |
| 2010/0009682 | A1 | 1/2010 | Iwamura et al. |
| 2010/0061285 | A1 | 3/2010 | Maeda et al. |
| 2011/0013548 | A1* | 1/2011 | Chen et al. ..................... 370/311 |
| 2011/0051711 | A1 | 3/2011 | Kishiyama et al. |
| 2011/0081856 | A1* | 4/2011 | Johansson et al. ................ 455/7 |
| 2012/0170485 | A1 | 7/2012 | Maeda et al. |

FOREIGN PATENT DOCUMENTS

| | | |
|---|---|---|
| JP | 2004-159297 A | 6/2004 |
| JP | 2008-182734 A | 8/2008 |
| JP | 2009-510806 A | 3/2009 |
| JP | 2011517895 A | 6/2011 |
| JP | 2011525782 A | 9/2011 |
| RU | 2313912 C2 | 12/2007 |
| WO | WO 2005/004500 A2 | 1/2005 |
| WO | WO 2005/107311 A1 | 11/2005 |
| WO | WO 2006/105004 A2 | 10/2006 |
| WO | WO 2007/005381 A2 | 1/2007 |
| WO | WO 2007/144956 A1 | 12/2007 |
| WO | WO 2007/145006 A1 | 12/2007 |
| WO | WO 2008/018130 A1 | 2/2008 |
| WO | WO 2008/044526 A1 | 4/2008 |
| WO | WO 2008/114977 A1 | 9/2008 |
| WO | WO 2009/119834 A1 | 10/2009 |

OTHER PUBLICATIONS

Ericsson, "Details of MAC DRX Control", R2-080934, TSG RAN WG2 Meeting #61, Sorento, Italy, Feb. 11-15, 2008, 5 pages.

3rd Generation Partnership Project (3GPP), R1-082848, "General Control Channel Design for LTE-A", ZTE, 3GPP TSG-RAN WG1 #54, Jeju, Korea, Aug. 18-22, 2008, 3 pages.

3rd Generation Partnership Project (3GPP), R1-083528, "Issues on Carrier Aggregation for Advanced E-UTRA", Texas Instruments, 3GPP TSG RAN WG1 54bis, Prague, Czech Republic, Sep. 29-Oct. 3, 2008, 6 pages.

3rd Generation Partnership Project (3GPP), R1-083730, "L1 Control Signaling With Carrier Aggregation in LTE-Advanced", Nokia Siemens Networks, 3GPP TSG-RAN WG1 Meeting #54bis, Prague, Czech Republic, Sep. 29-Oct. 3, 2008, 6 pages.

3rd Generation Partnership Project (3GPP), R1-083733, "Algorithms and Results for Autonomous Component Carrier Selection for LTE-Advanced", Nokia Siemens Networks, 3GPP TSG RAN WG1 #54bis Meeting, Prague, Czech Republic, Sep. 29-Oct. 3, 2008, 5 pages.

3rd Generation Partnership Project (3GPP), TS 25.301 V8.3.0, "Technical Specification Group Radio Access Network, Radio Interface Protocol Architecture (Release 8)", Sep. 2008, 1-51.

3rd Generation Partnership Project (3GPP), TS 25.301 V8.5.0, "Technical Specification Group Radio Access Network, Radio Interface Protocol Architecture (Release 8)", Mar. 2009, 1-52.

3rd Generation Partnership Project(3GPP), R1-082468, "Carrier aggregation in LTE-Advanced", 3GPP TSG RAN WG1 #53 bis, Ericsson, Warsaw, Poland, Jun. 30-Jul. 4, 2008, 6 pages.

* cited by examiner

US 8,953,548 B2

METHOD AND APPARATUS FOR MONITORING AND PROCESSING COMPONENT CARRIERS

CROSS REFERENCE TO RELATED APPLICATIONS

This application is a continuation of U.S. patent application Ser. No. 12/578,673, filed Oct. 14, 2009, which claims the benefit of U.S. Provisional Application No. 61/110,209, filed Oct. 31, 2008, which is incorporated by reference as if fully set forth.

TECHNICAL FIELD

This application is related to wireless communications.

BACKGROUND

A key feature of long term evolution advanced (LTE-A) is a higher data rate. This is supported by allowing a wireless transmit/receive unit (WTRU) to receive and transmit data on multiple LTE component carriers simultaneously in both uplink and downlink. This is referred to as carrier aggregation.

Receiving and transmitting on multiple carriers significantly increases the power consumption of the WTRU. It is known that the power consumption of the analog front-end, (which counts as a significant fraction of total power consumption at the WTRU), is linearly proportional to the bandwidth or a plurality of basic frequency blocks (i.e., component carriers) that are aggregated. Activating and deactivating additional component carriers on demand and rapidly is critical to saving WTRU resources, (e.g., hybrid automatic repeat request (HARQ) processing (including channel quality indicator (CQI) and sounding reference signal (SRS) reporting), buffer occupancy and buffer management, (e.g., buffer status report (BSR) reporting) and scheduling processing), and providing savings of power consumption.

SUMMARY

A method and apparatus are described which perform bandwidth aggregation by simultaneously monitoring and processing a number of simultaneous, non-contiguous or contiguous component carriers in the downlink. A WTRU can be configured by an evolved Node-B (eNodeB) to support additional component carriers. A pre-configured additional component carrier may be used. Various methods for activating and deactivating the additional component carrier are also described.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment.

When referred to hereafter, the terminology "evolved Node-B (eNodeB)" includes but is not limited to a base station, a site controller, an access point (AP), or any other type of interfacing device capable of operating in a wireless environment.

Figure 1:
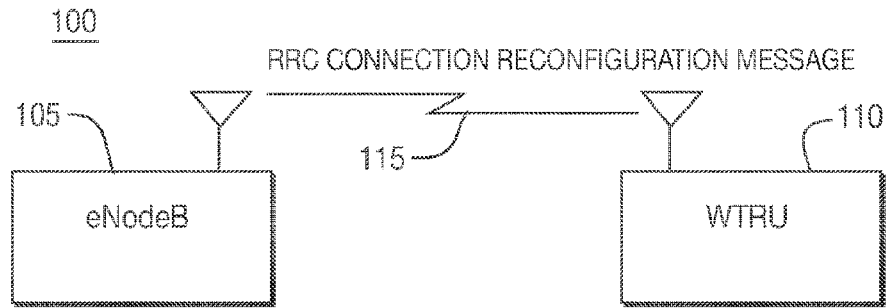
FIG. 1 shows a wireless communication system including an eNodeB and a WTRU.

FIG. 1 shows a wireless communication system 100 including an eNodeB 105 and a WTRU 110. The eNodeB 105 is configured to transmit a radio resource control (RRC) connection reconfiguration message 115 to the WTRU 110.

Various methods and apparatus for activating or deactivating the reception or transmission on the different carriers in an advanced LTE system employing carrier aggregation are described.

Transition to Connected Mode

In an idle mode, the WTRU 110 monitors and processes only a single component carrier. Idle mode procedures, such as system information (SI) acquisition and paging indication (PI) monitoring are transparent to the multiple carrier capability of the WTRU 110. Schemes like cell selection and cell reselection may remain the same with or without carrier aggregation, (referred to as bandwidth aggregation hereinafter), capability or may consider the bandwidth aggregation capability of the infrastructure, (eNodeB 105), as an input to system selection. However, as the WTRU 110 transitions to an RRC connected mode, (typically through an RRC connection request), the network is informed by the WTRU 110 of the WTRU capability in terms of bandwidth aggregation.

WTRU bandwidth aggregation capability can be defined as the number of simultaneous non-contiguous component carriers that can be monitored and processed simultaneously in the downlink for each band. An alternative metric can be the number of radio frequency (RF) receivers, (with different receivers handling non-contiguous carriers), and the largest bandwidth of each receiver. Consider an example where there are five component carriers: carriers 1 and 2 are contiguous to each other but not to carriers 3, 4 and 5, and carriers 3, 4, and 5 are contiguous.

WTRU bandwidth aggregation capability can also be defined as the number of simultaneous contiguous carriers that can be monitored and processed simultaneously in the downlink for each band.

WTRU bandwidth aggregation capability can also be defined as the largest supported bandwidth of aggregated contiguous carriers, not only the number of carriers, but also bandwidth.

WTRU bandwidth aggregation capability can also be defined as the largest total bandwidth of aggregated carriers (contiguous or not).

WTRU bandwidth aggregation capability can also be defined as the largest bandwidth supported per single carrier (in line with LTE current WTRU capability).

RRC Configuration of Component Carriers

After the WTRU informs the network of the WTRU's bandwidth capability in the RRC connection procedure, an eNodeB supporting bandwidth aggregation may configure the WTRU to support additional component carriers, (i.e., pre-configured additional component carriers). This may be performed with an RRC connection reconfiguration message carrying information that allows the WTRU to set up the monitoring, (grants and assignments), of one or more additional downlink and/or uplink carriers. Information included in the RRC connection reconfiguration message may include the cell identity (ID), the carrier center frequency, the carrier bandwidth, the carrier direction (uplink or downlink), and other information required to setup in a timely fashion the activation and synchronization of pre-configured additional component carriers.

One RRC connection reconfiguration message may be sufficient to setup more than one component carrier by stacking the information previously described for all pre-configured additional component carriers.

The reception of the RRC connection reconfiguration message alone may not activate the monitoring and processing of the additional component carriers immediately or after a delay. In this case, only an explicit or implicit activation command as described below would allow the WTRU to start monitoring and processing additional carriers. Alternatively, the RRC connection reconfiguration message may contain a field that signals whether or not the monitoring and processing should start after the successful reconfiguration procedure is completed. This may be useful to verify at setup that the pre-configured additional component carriers are operational. Alternatively, the reception of the RRC connection reconfiguration message activates the monitoring and processing of the additional component carriers immediately or after a delay.

The RRC connection reconfiguration message may contain the additional information that would allow the WTRU to setup additional component carriers controlled by another eNodeB, such as timing advance and other synchronization related information.

The RRC connection reconfiguration message can provide a specific cell radio network temporary identifier (C-RNTI) per additional component carrier.

The RRC connection reconfiguration message may, for efficiency, assign to each pre-configured additional component carrier a bit combination up to the number of maximum simultaneous additional component carriers that can be supported, so that activation or deactivation of an individual component carrier can be referred to by using this assigned bit combination.

Mechanisms to Activate or Deactivate Pre-Configured Additional Component Carriers MAC Control Elements Activation or deactivation of a pre-configured additional carrier or a pre-defined subset of pre-configured additional carriers can occur at the reception of a medium access control (MAC) control element (CE). The activation or deactivation can take effect after a predefined delay, (fixed or configurable through higher layer signaling), or immediately after reception of the MAC CE. This would be implemented by a new type MAC CE, referred to as a MAC_CE_Activation control element.

The MAC_CE_Activation control element may contain a bit combination field to indicate which pre-configured carrier is being activated or deactivated. Alternatively, the carrier being activated or deactivated may be indicated by the C-RNTI value used for the transmission of the MAC PDU containing the MAC control element. One MAC_CE_Activation control element may activate or deactivate multiple carriers at the same time by aggregating the bit combinations or transmitting multiple MAC PDUs using a different C-RNTI.

The indication of whether the command corresponds to activation or deactivation may be performed by setting a bit or it may be implicit based on the current activation or deactivation state of the carrier. Alternatively, it may be based on the carrier the MAC PDU was received on. For example, if the MAC CE was contained in a MAC PDU received in a given carrier, (e.g., an "anchor carrier" or a "serving cell"), then the command is understood to be for activation of the carrier indicated in the MAC CE. If the MAC CE was contained in a MAC PDU received in a carrier, (possibly without explicit indication of a carrier within the MAC CE itself), then the command is understood to be a deactivation for the carrier the MAC PDU was received from, or alternatively a deactivation for a pre-defined set of carriers.

Another alternative is that all MAC_CE_Activations are always received on a specific carrier, (e.g., the carrier corresponding to the serving cell).

Activation on Demand

The reception of a physical downlink control channel (PDCCH) on a specific carrier (such as an "anchor carrier") with a new downlink control information (DCI) format (or a modified DCI format for LTE advanced) may signal to the WTRU that transmission to, or reception from, a pre-configured additional uplink (PUSCH) or downlink (PDSCH) carrier, (or a pre-defined subset of pre-configured additional uplink or downlink carriers), will take place in X subframes. (To start monitoring the PDCCH on a new carrier requires a few subframes of lead time.) The delay allows the WTRU analog front-end to setup to the new carrier, which includes phase-locked loop (PLL) and automatic gain control (AGC) settling time and frequency synchronization. The new DCI format contains a field to map the activation with the pre-configured carrier as explained above. This allows the WTRU to only monitor the PDCCH from a single carrier, (e.g., a special carrier called "anchor carrier" or the carrier corresponding to the serving cell), and consequent battery savings. The indication from the anchor carrier may be for a single grant or assignment on the additional component carrier. In this case, HARQ feedback corresponding to the grant or assignment may also be delayed (with respect to the PDCCH transmission) compared to existing systems. Alternatively, the indication from the anchor carrier may signal to the WTRU that it should start monitoring the PDCCH on the additional component carrier or subset of component carriers until this carrier (or these carriers) is (are) deactivated.

The PDCCH received with a new DCI format (or modified DCI format for LTE advanced) on a carrier, (e.g., an "anchor carrier"), may provide a time delayed allocation (physical resource blocks (PRBs), modulation and coding sets (MCS), and the like) on a pre-configured additional component carrier. The delay is based on the WTRU capability to tune and synchronize to a pre-configured component carrier. This delay may be fixed or variable based on WTRU capability. Time delayed allocation is already used for uplink allocation—a four subframe delay. However, this method allows the WTRU to know about the possibility of an upcoming uplink transmission more in advanced compared to the existing system. Such advance knowledge may be useful for uplink scheduling decisions. The same approach may be used for a pre-configured additional component carrier. This brings the advantage that pre-configured additional component carriers are activated on demand by allocating the resources in advance.

Implicit Activation

Implicit activation of one or a number of carriers may take place when the volume of traffic received on the downlink, (measured at the Physical (PHY), MAC, radio link control (RLC), or packet data convergence protocol (PDCP) layer), within a pre-determined or configured amount of time exceeds a pre-determined or configured threshold. There may be several thresholds defined, each corresponding to a particular carrier to activate. For example, carrier C1 may be activated when the volume of traffic exceeds V1, and carrier C2 may be activated when the volume of traffic exceeds V2, and the like.

Implicit activation of one or a number of carriers may also take place when the WTRU initiates transmission, (either on the random access channel (RACH), physical uplink control channel (PUCCH), or physical uplink shared channel (PUSCH)), on a certain uplink carrier that is associated to the downlink carrier to activate. This association may be pre-defined or provided to the WTRU through RRC signaling, (system information or dedicated signaling).

When a downlink carrier is activated, the WTRU initiates reception on the PDCCH configured for this carrier, (if a PDCCH is defined per carrier), and transmission on the PUCCH is configured for this carrier to transmit the feedback information.

Implicit Deactivation

Implicit deactivation may be performed based on an inactivity timer specific to the additional component carrier activity. For example, only the anchor carrier is active during a Web browsing session. If a download is started, start allocating PRBs on the pre-configured additional component carrier for this WTRU. Once the download is completed, the network stops assigning resources to the pre-configured additional component carrier for the WTRU. After some inactivity timer, (specific to the pre-configured carrier), expires, the WTRU stops monitoring the PDCCH, (i.e., dedicated PDCCH per carrier), and shuts down the front-end radio resources allocated to this carrier. Alternatively, the WTRU may stop monitoring the PDCCH of a carrier after expiry of a timing alignment timer (or other timer) defined specifically for this carrier. Such a timing alignment timer may be restarted based on the reception of a timing alignment MAC control element from a MAC PDU received on the carrier.

In the case of activation on demand and a shared control channel on the anchor carrier, the WTRU can shut down the front-end resources allocated to a pre-configured additional component carrier as soon as the time delayed allocation to this carrier is not received. The WTRU may determine that it is more optimal to wait for a few consecutive subframes without allocation to pre-configured additional component carriers before shutting down the front-end resources associated with these carriers.

Implicit deactivation may also be based on radio conditions. As an example, if the channel conditions of a carrier remain under a certain minimum threshold for a period of time, the front-end radio resources may be de-allocated.

Explicit Deactivation Order on PDCCH

Explicit deactivation may be performed by sending a deactivation order specific to the component carrier so that the WTRU no longer needs to monitor the PDCCH, (dedicated PDCCH per carrier). The order may be sent using a PDCCH with a new DCI format on the anchor carrier for the dedicated channel. Alternatively, the deactivation order using the PDCCH may be sent only to the pre-configured additional component carrier.

Activation or Deactivation in DRX Connected Mode

MAC DRX configuration may remain the same with carrier aggregation. On-duration and DRX cycle apply to the configured carriers, (e.g., an "anchor carrier" or serving cell), as well as to activated pre-configured additional component carriers, ("resource carriers").

A DRX_Inactivity_timer running in the WTRU may be started or restarted if the PDCCH is received over an activated pre-configured additional component carrier for a new transmission.

The DRX_Inactivity_timer may also be started or restarted if a scheduled grant for an activated pre-configured additional component carrier is received for a new transmission.

Alternatively, the MAC DRX configuration may have a specific DRX_Inactivity_timer for each of the pre-configured additional component carriers. The DRX_Inactivity_timer associated to a carrier would be started or restarted when a PDCCH assignment is received on this carrier. This would enable the WTRU to effectively deactivate these pre-configured carriers until the next on-duration cycle while the anchor carrier remains in active time.

The logic described previously for the DRX_Inactivity_Timer may also apply to other DRX timers, such as the ON_Duration_Timer and the DRX_Retransmission_Timer.

Figure 2:
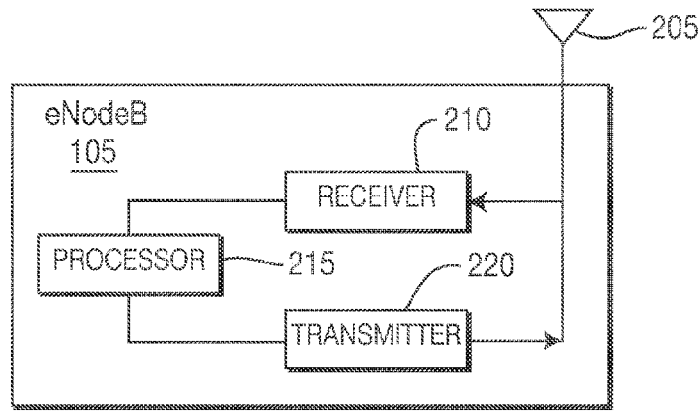
FIG. 2 is a block diagram of the eNodeB of FIG. 1.

FIG. 2 is a block diagram of the eNodeB 105 of FIG. 1. The eNodeB 105 includes an antenna 205, a receiver 210, a processor 215 and a transmitter 220. The receiver 210 is configured to receive a signal indicating a bandwidth aggregation capability of the WTRU 110. The transmitter 220 is configured to transmit an RRC connection reconfiguration message to the WTRU 110.

Figure 3:
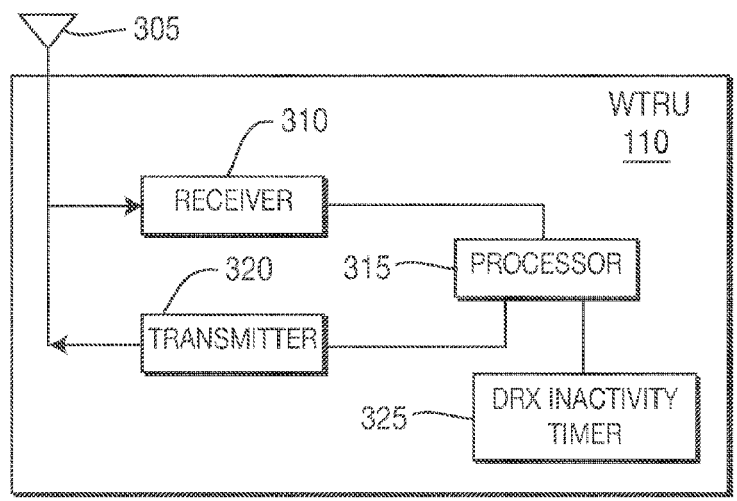
FIG. 3 is a block diagram of the WTRU of FIG. 1.

FIG. 3 is a block diagram of the WTRU 110 of FIG. 1. The WTRU 110 includes an antenna 305, a receiver 310, a processor 315, a transmitter 320 and a discontinuous reception (DRX) inactivity timer 325.

The WTRU 110 monitors and processes component carriers. The receiver 310 in the WTRU 110 is configured to monitor and process a single component carrier. The transmitter 320 in the WTRU 110 is configured to transmit a signal indicating a bandwidth aggregation capability of the WTRU 110. The receiver 310 is further configured to receive an RRC connection reconfiguration message. The processor 315 in the WTRU 110 is configured to set up for monitoring and processing at least one pre-configured additional component carrier.

The receiver 310 may be further configured to receive a MAC CE, and the processor 315 may be configured to activate or deactivate the pre-configured additional component carrier.

The pre-configured additional component carrier may be immediately activated or deactivated in response to receiving the MAC CE, or may be activated or deactivated after a predefined delay. The pre-configured additional component carrier may be an uplink carrier or a downlink carrier.

The WTRU 110 may monitor and process the single component carrier while in an idle mode.

In one example, the bandwidth aggregation capability may indicate a number of simultaneous non-contiguous component carriers that can be monitored and processed simultaneously in the downlink for each band.

In another example, the bandwidth aggregation capability may indicate a number of RF receivers and the largest bandwidth of each receiver.

In yet another example, the bandwidth aggregation capability may indicate a number of simultaneous contiguous carriers that can be monitored and processed simultaneously in the downlink for each band.

In yet another example, the bandwidth aggregation capability may indicate the largest supported bandwidth of aggregated contiguous carriers.

In yet another example, the bandwidth aggregation capability may indicate the largest total bandwidth of aggregated carriers.

In yet another example, the bandwidth aggregation capability may indicate the largest bandwidth supported per single carrier.

The bandwidth aggregation capability may indicate more than one of the examples described above.

In another scenario, the receiver 310 may be configured to receive a PDCCH on a specific carrier with a DCI format that indicates that transmission to, or reception from, a pre-configured additional uplink or downlink carrier will take place in a certain number of subframes. The processor 315 may be configured to set up for monitoring and processing the pre-configured carrier.

Figure 4:
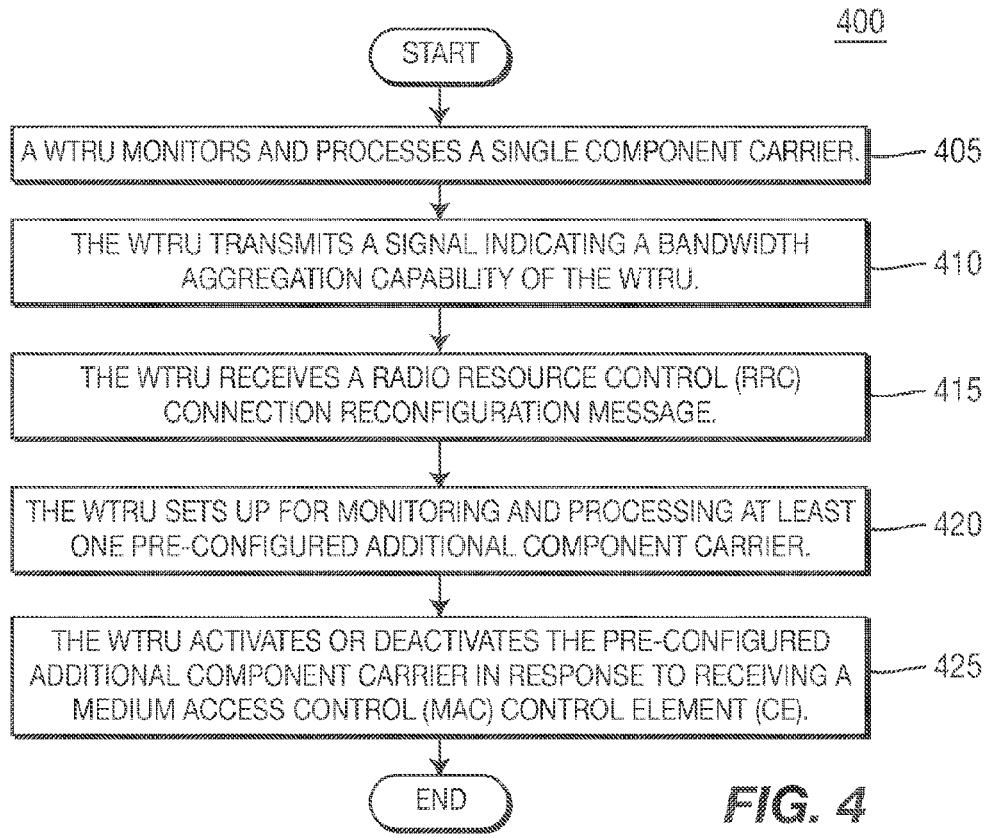
FIGS. 4 and 5 show procedures for monitoring and processing component carriers.

FIG. 4 shows a procedure 400 for monitoring and processing component carriers. In step 405, a WTRU monitors and processes a single component carrier. In step 410, the WTRU transmits a signal indicating a bandwidth aggregation capability of the WTRU. In step 415, the WTRU receives an RRC connection reconfiguration message. In step 420, the WTRU sets up for monitoring and processing at least one pre-configured additional component carrier. In step 425, the WTRU activates or deactivates the pre-configured additional component carrier in response to receiving a MAC CE.

Figure 5:
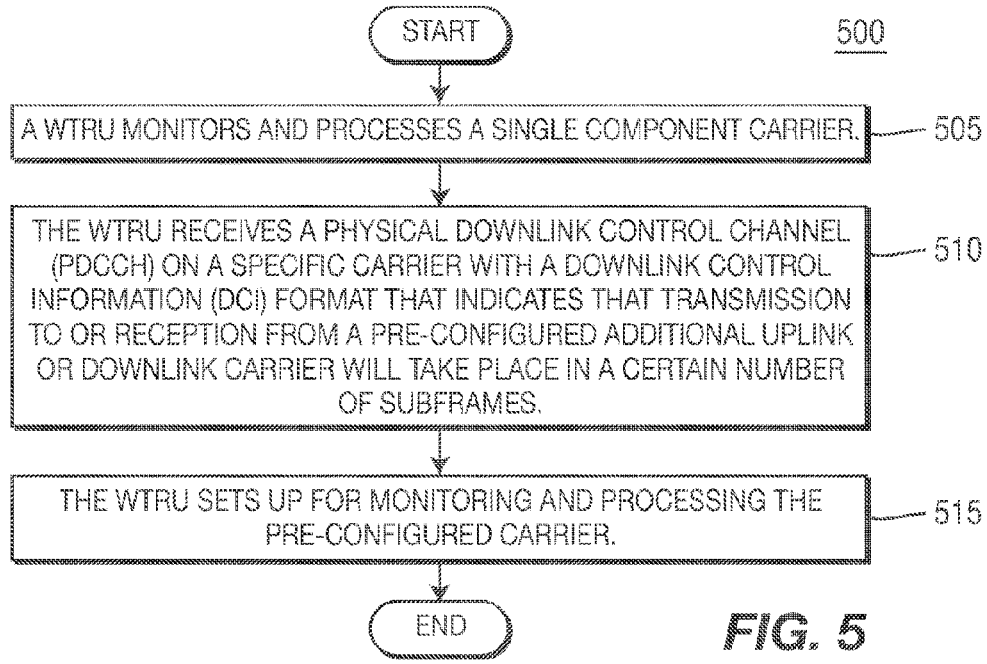

FIG. 5 shows a procedure 500 for monitoring and processing component carriers. In step 505, a WTRU monitors and processes a single component carrier. In step 510, the WTRU receives a PDCCH on a specific carrier with a DCI format that indicates that transmission to, or reception from, a pre-configured additional uplink or downlink carrier will take place in a certain number of subframes. In step 515, the WTRU sets up for monitoring and processing the pre-configured carrier.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, application specific integrated circuits (ASICs), application specific standard products (ASSPs), field programmable gate arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, mobility management entity (MME) or evolved packet core (EPC), or any host computer. The WTRU may be used in conjunction with modules, implemented in hardware and/or software including a software defined radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a near field communication (NFC) module, a liquid crystal display (LCD) display unit, an organic light-emitting diode (OLED) display unit, a digital music player, a media player, a video game player module, an Internet browser, and/or any wireless local area network (WLAN) or ultra wide band (UWB) module.

What is claimed is:

1. A method implemented by a wireless transmit/receive unit (WTRU), the method comprising:
   receiving a radio resource control (RRC) reconfiguration message, wherein the RRC reconfiguration message configures the WTRU to support at least one additional component carrier and the RRC reconfiguration message does not activate the at least one additional component carrier;
   receiving a medium access control (MAC) control element (CE), wherein the MAC CE indicates that the at least one additional component carrier is to be activated, and the MAC CE comprises a bit combination field that is indicative of which component carriers are to be activated; and
   activating the at least one additional component carrier based on receiving the MAC CE.

2. The method as in claim 1, wherein activating the at least one additional component carrier comprises beginning to process transmissions sent via the at least one additional component carrier.

3. The method as in claim 2, wherein the at least one additional component carrier is activated after a predefined delay after receiving the MAC CE.

4. The method as in claim 1, wherein the bit combination field indicates which component carriers are to be activated based on identifying information for the component carriers that is assigned in the RRC reconfiguration message.

5. The method as in claim 1, wherein the bit combination field indicates that multiple component carriers are to be activated.

6. The method as in claim 1, wherein the bit combination field indicates that at least one active component carrier is to be deactivated.

7. The method as in claim 1, wherein the bit combination field comprises an aggregation of identifiers for a plurality of component carriers.

8. The method as in claim 1, further comprising maintaining a deactivation timer for each active component carrier, wherein the WTRU stops monitoring a physical downlink control channel (PDCCH) for the active component carrier upon expiration of the deactivation timer for the active component carrier.

9. The method as in claim 8, wherein the deactivation timer for the active component carrier is started based on resources being assigned to the WTRU on the active component carrier.

10. The method as in claim 1, wherein the RRC reconfiguration message comprises a cell identity and a carrier frequency for the at least one additional component carrier.

11. A wireless transmit/receive unit (WTRU) comprising:
    a processor and memory, the processor configured to:
    receive a radio resource control (RRC) reconfiguration message, wherein the RRC reconfiguration message configures the WTRU to support at least one additional component carrier and the RRC reconfiguration message does not activate the at least one additional component carrier;
    receive a medium access control (MAC) control element (CE), wherein the MAC CE indicates that the at least one additional component carrier is to be activated, and the MAC CE comprises a bit combination field that is indicative of which component carriers are to be activated; and
    activate the at least one additional component carrier based on receiving the MAC CE.

12. The WTRU as in claim 11, wherein the processor is further configured to:
   start processing transmissions sent via the at least on additional component carrier upon activating the at least one additional component carrier.

13. The WTRU as in claim 11, wherein the bit combination field indicates which component carriers are to be activated based on identifying information for the component carriers that is assigned in the RRC reconfiguration message.

14. The WTRU as in claim 11, wherein the bit combination field indicates that multiple component carriers are to be activated.

15. The WTRU as in claim 11, wherein the bit combination field indicates that at least one active component carrier is to be deactivated.

16. The WTRU as in claim 11, wherein the processor is further configured to maintain a deactivation timer for each active component carrier, wherein the WTRU is configured to stop monitoring a physical downlink control channel (PDCCH) for the active component carrier upon expiration of the deactivation timer for the active component carrier.

17. The WTRU as in claim 16, wherein the deactivation timer for the active component carrier is started based on resources being assigned to the WTRU on the active component carrier.

18. The WTRU as in claim 11, wherein the RRC reconfiguration message comprises a cell identity and a carrier frequency for the at least one additional component carrier.

19. The WTRU as in claim 11, wherein the processor is further configured to initiate reception of a physical downlink control channel (PDCCH) of the at least one additional component carrier after a pre-defined delay upon activating the at least one additional component carrier.

20. An evolved Node-B (eNB) comprising:
   a processor and memory, the processor configured to:
   transmit a radio resource control (RRC) reconfiguration message, wherein the RRC reconfiguration message configures a wireless transmit receive unit (WTRU) to support at least one additional component carrier, and the RRC reconfiguration message does not activate the at least one additional component carrier for use by the WTRU;
   transmit a medium access control (MAC) control element (CE) to the WTRU, wherein the MAC CE indicates that the at least one additional component carrier is to be activated for use by the WTRU and the MAC CE comprises a bit combination field that is indicative of which component carriers are to be activated by the WTRU; and
   send at least one transmission to the WTRU via the at least one additional component carrier.

* * * * *